(12) United States Patent
Mizohata (10) Patent No.: US 7,337,677 B2
(45) Date of Patent: Mar. 4, 2008

(54) DIFFERENTIAL PRESSURE FLOWMETER, FLOW CONTROLLER, AND APPARATUS FOR PROCESSING SUBSTRATE

(75) Inventor: Yasuhiro Mizohata, Kyoto (JP)

(73) Assignee: Dainippon Screen Mfg. Co., Ltd. (JP)

( * ) Notice: Subject to any disclaimer, the term of this patent is extended or adjusted under 35 U.S.C. 154(b) by 194 days.

(21) Appl. No.: 11/252,322

(22) Filed: Oct. 14, 2005

(65) Prior Publication Data

US 2006/0112771 A1   Jun. 1, 2006

(30) Foreign Application Priority Data

Nov. 30, 2004 (JP) .............................. 2004-345162

(51) Int. Cl.
*G01F 1/37* (2006.01)
(52) U.S. Cl. .................................. 73/861.52
(58) Field of Classification Search ............. 73/861.52, 73/861.356, 54.06, 54.24, 861.61, 861.63, 73/861.64
See application file for complete search history.

(56) References Cited

U.S. PATENT DOCUMENTS

| | | | | |
|---|---|---|---|---|
| 4,023,398 A | * | 5/1977 | French et al. ................. | 73/23.2 |
| 4,118,973 A | * | 10/1978 | Tucker et al. ............... | 73/54.07 |
| 5,422,014 A | * | 6/1995 | Allen et al. .................. | 210/743 |
| 5,672,832 A | | 9/1997 | Cucci et al. | |
| 5,772,736 A | * | 6/1998 | van Schravendijk et al. ... | 95/46 |
| 5,861,561 A | * | 1/1999 | Van Cleve et al. ...... | 73/861.52 |
| 6,578,435 B2 | | 6/2003 | Gould et al. | |
| 6,766,817 B2 | | 7/2004 | de Silva | |
| 6,973,375 B2 | | 12/2005 | Brodeur et al. | |
| 7,189,254 B2 | * | 3/2007 | Magers ....................... | 607/105 |

FOREIGN PATENT DOCUMENTS

| | | |
|---|---|---|
| JP | 2000-283810 | 10/2000 |
| JP | 2004-226142 | 8/2004 |
| JP | 2004-226144 | 8/2004 |

* cited by examiner

*Primary Examiner*—Jewel Thompson
(74) *Attorney, Agent, or Firm*—Ostrolenk, Faber, Gerb & Soffen, LLP (57) ABSTRACT

A differential pressure flowmeter comprises a tube having a circular section, a first pressure sensor for measuring a pressure of a liquid flowing into the tube, a second pressure sensor for measuring a pressure of a liquid flowing out of the tube, a storage part for storing information and an operation part for performing various computations. In the differential pressure flowmeter, a laminar flow where a Reynolds number is less than or equal to 2000 is formed within the tube. Outputs from the first pressure sensor and the second pressure sensor are transmitted to the operation part, a pressure difference between both ends of the tube is obtained, and then a flowrate of a liquid flowing through the tube is determined on the basis of the pressure difference and flowrate information stored in the storage part in advance. In the differential pressure flowmeter, after the flow is made laminar completely, the pressure difference is obtained and it is thereby possible to perform measurement of the flowrate stably with high accuracy.

21 Claims, 4 Drawing Sheets

DIFFERENTIAL PRESSURE FLOWMETER, FLOW CONTROLLER, AND APPARATUS FOR PROCESSING SUBSTRATE

BACKGROUND OF THE INVENTION

1. Field of the Invention

The present invention relates to a differential pressure flowmeter for measuring a flowrate of a fluid, and preferably, a differential pressure flowmeter is used for a flow controller for controlling a flowrate of a fluid and an apparatus for processing a substrate.

2. Description of the Background Art

Conventionally, in cleaning a semiconductor substrate (hereinafter, referred to as simply "substrate"), well known a technique where a dilute hydrochloric acid (HCl) is used instead of a pure water as a cleaning liquid, whereby preventing fine particles in the cleaning liquid from adhering to a surface of the substrate by a Coulomb force. Also, etching of the substrate is performed by using a dilute hydrofluoric acid (HF) or final cleaning of the substrate is performed by using a dilute acid solution (hydrochloric acid, hydrofluoric acid or the like).

A cleaning apparatus of the substrate uses a solution diluted a stock solution of the hydrochloric acid at less than or equal to 1/1000. For simplification or miniaturization or the like of a construction of an apparatus, this diluted solution is normally produced by a method (i.e., the so-called direct mixing method) in which a small amount of the undiluted solution of hydrochloric acid is directly injected into a tube for the pure water of the cleaning apparatus. In the cleaning apparatus, a flowrate of the hydrochloric acid injected into the pure water is measured by a flowmeter and by controlling the flowrate of the hydrochloric acid on the basis of an output from the flowmeter, the diluted solution is set at the desired concentration.

In the above case, employed is a differential pressure flowmeter where the flowrate is measured to measure a pressure difference in the front and back of an orifice plate disposed within a channel and Japanese Patent Application Laid Open Gazette No. 2000-283810 (Document 1) discloses a technique for improving measuring accuracy of this flowmeter. Also, U.S. Pat. No. 5,672,832 (Document 2) and U.S. Pat. No. 6,578,435 (Document 3) disclose a differential pressure flowmeter where a nozzle is utilized instead of an orifice plate. Japanese Patent Application Laid Open Gazette No. 2004-226142 (Document 4) and Japanese Patent Application Laid Open Gazette No. 2004-226144 (Document 5) disclose a differential pressure flowmeter where by measuring a pressure difference in both ends of a capillary, measurement of a very small flowrate is performed stably.

In producing the diluted solution, an extremely small amount of an undiluted solution needs to be injected into the pure water with high accuracy. For example, in a batch-type cleaning apparatus, a flowrate of the undiluted solution is normally less than or equal to 100 ml/min, this very small flowrate needs to be measured high accurately and controlled. In a single wafer-type cleaning apparatus, a flowrate of a stock (or undiluted) solution is set to be less than or equal to 10 ml/min.

Since the differential pressure flowmeters of Documents 1 to 3 make turbulent flow in the vicinity of the orifice plate or the nozzle and measure a flowrate, they are not suitable for measurement of a very small flowrate having a high possibility of a laminar flow. In the case of measuring a very small flowrate by these differential pressure flowmeters, an orifice or a nozzle with a very small diameter needs to be formed high accurately to obtain a significant pressure difference in the front and back of the orifice plate or the nozzle. This leads to not only increase in manufacturing costs of the differential pressure flowmeter but, when a flowrate is smaller, there is a possibility that the orifice or the like can not be formed in a desired size. Further, the orifice or the nozzle with the very small diameter may be blocked by foreign substances or there is a risk that cavitation may occur in the vicinity of the orifice or an outlet of the nozzle.

In the differential pressure flowmeters of Documents 4 and 5, a long capillary is used as a pressure loss part and assuming that a flow of a liquid in the capillary is laminar, a flowrate is obtained on the basis of an equation with respect to pressure loss in the laminar flow in a circular tube. This makes a diameter of the capillary relatively large and attempts to resolve problems of the differential pressure flowmeters of Documents 1 to 3. However, in the case where the flow is transitional or turbulent, the measuring accuracy of a flowrate decreases, and thus it is important to make a stable laminar flow. Also, since the flowrate is obtained by using the above equation concerning a straight circular tube in spite of using the capillary having a bending part actually, errors of measuring flowrate increase. Further, a stainless-steel capillary is joined to a capillary block by brazing, therefore formation or arrangement of the capillary is limited and also it is difficult to adjust a length of the capillary.

SUMMARY OF THE INVENTION

The present invention is intended for a differential pressure flowmeter for measuring a flowrate of a fluid. The differential pressure flowmeter comprises a circular tube in which a flow of a fluid with a Reynolds number less than or equal to 2000 is formed, a first pressure sensor, placed in an upstream side of the circular tube, for measuring a pressure of the fluid flowing into the circular tube and a second pressure sensor, placed in a downstream side of the circular tube, for measuring a pressure of the fluid flowing out of the circular tube.

According to the differential pressure flowmeter in accordance with the present invention, after the flow is made laminar completely, a pressure difference is obtained. It is thereby possible to perform measurement of the flowrate stably with high accuracy.

According to one preferred embodiment of the present invention, the circular tube is made of resin and more preferably, an outer diameter of the circular tube is set to be 1.5 or more times larger than an inner diameter of the circular tube.

According to another preferred embodiment of the present invention, the circular tube has flexibility. This improves the flexibility of arrangement of the circular tube. Also, it is preferable that the circular tube is formed in a coil and thus it is possible to reduce a size of the differential pressure flowmeter.

According to still another preferred embodiment of the present invention, a length of the circular tube is set to be 130 or more times than an inner diameter of the circular tube. This makes it possible to measure the pressure difference after generating the flow within the circular tube fully and to perform highly accurate measurement of the flowrate.

According to an aspect of the present invention, the differential pressure flowmeter further comprises two fittings for attaching both ends of the circular tube detachably to a channel connected to the first pressure sensor and a channel connected to the second pressure sensor, respectively. This makes it possible to adjust the length of the circular tube easily.

According to another aspect of the present invention, the fluid is liquid and an outlet of the second pressure sensor is positioned at the same height with respect to a vertical direction as an inlet of the first pressure sensor or at a higher position than the inlet of the first pressure sensor.

According to still another aspect of the present invention, the differential pressure flowmeter further comprises a storage part for storing flowrate information in advance, the flowrate information indicating a relation between a pressure difference and a flowrate of the fluid flowing through the circular tube, the pressure difference being a difference between a pressure of the fluid flowing into the circular tube and a pressure of the fluid flowing out of the circular tube and an operation part for obtaining the pressure difference from outputs of the first pressure sensor and the second pressure sensor and determining the flowrate of the fluid on the basis of the flowrate information and the pressure difference.

The present invention is also intended for a flow controller comprising the differential pressure flowmeter, for controlling a flowrate of a fluid and also intended for a substrate processing apparatus comprising the flow controller.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
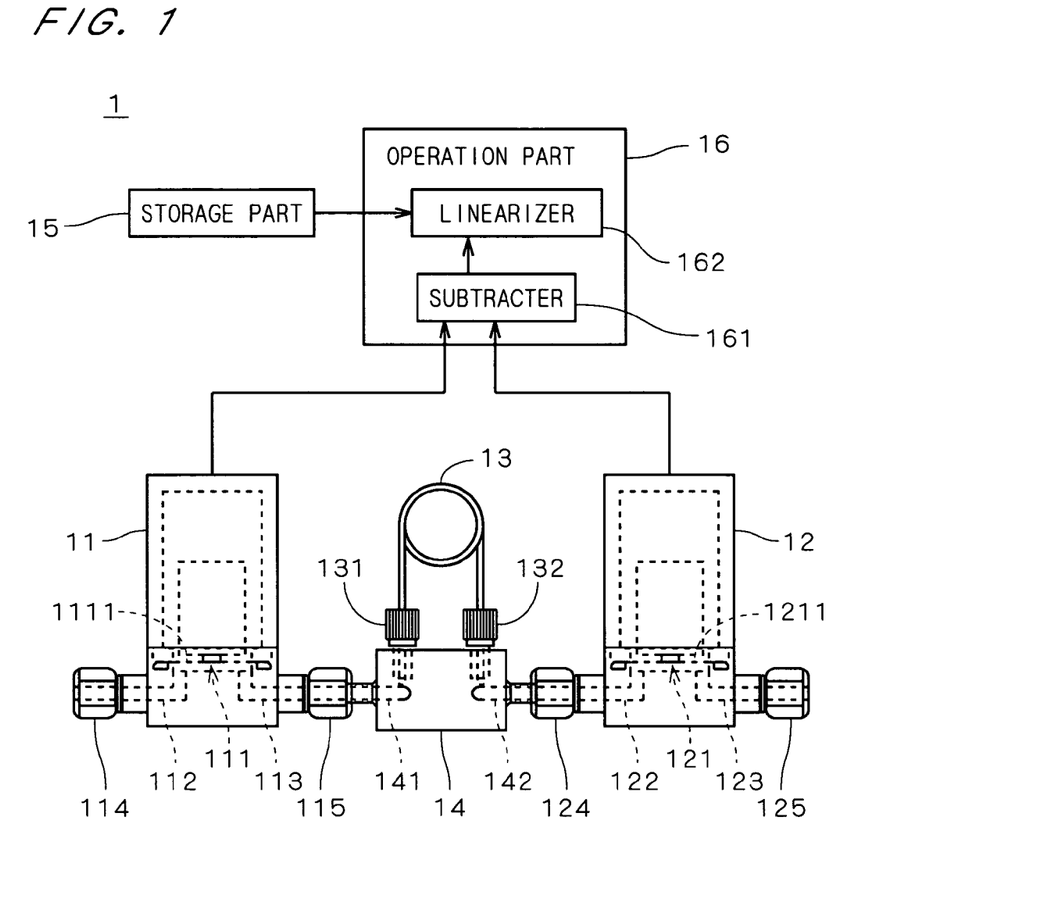
FIG. 1 is a front view illustrating a construction of a differential pressure flowmeter in accordance with a first preferred embodiment.
Figure 2:
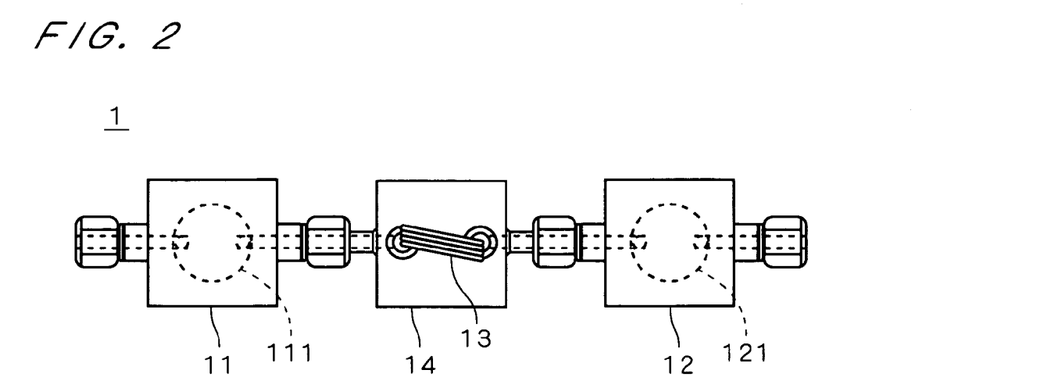
FIG. 2 is a plan view illustrating the differential pressure flowmeter.

FIG. 1 is a front view illustrating a construction of a differential pressure flowmeter 1 in accordance with the first preferred embodiment of the present invention and FIG. 2 is a plan view illustrating the differential pressure flowmeter 1. The differential pressure flowmeter 1 is installed on a conduit through which liquid (i.e., fluid) flows and used for measuring a flowrate of the liquid flowing through the conduit. In FIGS. 1 and 2, conduits of an upstream side and a downstream side of the differential pressure flowmeter 1 are not shown.

As shown in FIGS. 1 and 2, the differential pressure flowmeter 1 comprises a tube 13 which is a pressure loss part having a circular section, a tube base 14 to which the tube 13 is attached, a first pressure sensor 11 placed in an upstream side of the tube 13 (in the left of FIGS. 1 and 2) for measuring a pressure of a liquid flowing into the tube 13 and a second pressure sensor 12 placed in a downstream side of the tube 13 for measuring a pressure of a liquid flowing out of the tube 13. As shown in FIG. 1, the differential pressure flowmeter 1 further comprises a storage part 15 for storing information and an operation part 16 for performing various computations.

The tube 13 is made of resin and has high durability (mainly, corrosion resistance) against various kinds of fluid. The tube 13 has flexibility and is formed in a coil on the upper part of the tube base 14 as shown in FIG. 2. Materials, such as PEEK (poly-ether-ether-ketone), PTFE (poly-tetra-fluoro-ethylene), PCTFE (poly-chloro-trifluoro-ethylene), PFA (per-fluoro-alkoxy), ETFE (ethylene-tetrafluoro-ethylene), FEP (fluorinated-ethylene-propylene) or the like, are available for the tube 13. A material for the tube 13 is determined on the basis of various kinds of liquid which are measured, an inner diameter of the tube 13, or the like. In the first preferred embodiment, the tube 13 is made of PFA.

The inner diameter of the tube 13 is determined on the basis of the maximum value of a measuring flowrate of the differential pressure flowmeter 1 such that a Reynolds number of a flow of a liquid within the tube 13 is made at less than or equal to 2000. The Reynolds number is the dimensionless number indicating the type of a flow (i.e., a flow is laminar or turbulent). When a Reynolds number of a flow is smaller than a critical Reynolds number (about 2000 to 2300), the flow is kept laminar. A Reynolds number Re within the tube 13 having a circular section is expressed as Eq. 1 where D (m) is the inner diameter of the tube 13.

$$Re = \rho U D/\mu = 4\rho Q/\pi\mu D \qquad \text{Eq. 1}$$

In Eq. 1, $\rho$ is density ($kg/m^3$) of a fluid flowing through the tube 13, $\mu$ is coefficient of viscosity ($N \cdot s/m^2$) of the fluid, U is average flowing velocity (m/s) of the fluid in a cross-sectional area vertical to a longitudinal direction of the tube 13, and Q is a flowrate ($m^3/s$) of the fluid. In the first preferred embodiment, the maximum value of the measuring flowrate of the differential pressure flowmeter 1 is 60 ml/min. For example, where a fluid is water at room temperature, to obtain a Reynolds number less than or equal to 2000, it is necessary that an inner diameter of the tube 13 is set to be 0.65 mm or larger. In the first preferred embodiment, the PFA tube is used for the tube 13, which is available commercially and has an inner diameter of 0.75 mm. The maximum value of a Reynolds number within a measuring range (i.e., a Reynolds number at the maximum of the measuring flowrate) is set to be less than or equal to 2000 and laminar flow occurs within the tube 13. Resin tubes which are available commercially have inner diameters of 25 μm, 50 μm, 75 μm, 0.1 mm, 0.125 mm, 0.15 mm, 0.175 mm, 0.2 mm, 0.25 mm, 0.5 mm, 0.75 mm, or more larger. These tubes can be used for the tube 13 easily.

As discussed above, for the laminar flow within the tube 13, an inlet length X(m) necessary for full development of the flow of the fluid (i.e., velocity distribution of the flow within the cross-sectional area of the tube 13 goes into a constant state) is expressed as Eq. 2 for the Boussinesq equation by using the Reynolds number Re and the inner diameter D(m) of the tube 13.

$$X \geq 0.065 Re \cdot D \qquad \text{Eq. 2}$$

A length of the tube 13 is preferably set to be 130 or more times than the inner diameter of the tube 13 so that the length of which becomes longer than the inlet length even if the Reynolds Number is 2000. The length of the tube 13, which is discussed later, is determined on the basis of a pressure loss required in the tube 13 (i.e., a pressure difference between both ends of the tube 13). In the first preferred embodiment, the required pressure loss is 80 kPa and the length of the tube 13 is 40 cm. An outer diameter of the tube 13 is set to be 1.5 or more times larger than the inner diameter so as to ensure mechanical strength of the tube 13 of resin.

The tube base 14 is a block of resin (made of the PTFE, for example), as shown in FIG. 1, within the tube base 14, a channel 141 and a channel 142 are formed. The channel 141 is almost (reversed) L-shaped and connects a side facing to the first pressure sensor 11 and a top of the tube base 14. The channel 142 is almost L-shaped and connects a side facing to the second pressure sensor 12 and a top of the tube base 14. The channel 141 and the channel 142 are respectively formed into two projecting parts from the side of the tube base 14, one of which projects out to the first pressure sensor 11 and the other to the second pressure sensor 12. Both ends of the tube 13 are attached detachably to opening parts of the channel 141 and the channel 142 which are provided on the top of the tube base 14 through the tube fittings 131, 132 of resin. The tube fittings 131, 132 and the opening parts of the channels 141, 142 provided on the top of the tube base 14 serve as two fittings which attach both ends of the tube 13 detachably to the channel 141 connected to the first pressure sensor 11 and the channel 142 connected to the second pressure sensor 12, respectively. As the tube fittings 131, 132, various small diameter fittings used for liquid chromatography or the like can be used.

Referring again to FIGS. 1 and 2, the first pressure sensor 11 includes a low-height pressure transducer 111 which has an approximately cylindrical shape. As shown in FIG. 1, a member 1111 positioned in the pressure transducer 111 and exposed to the liquid is made of resin (for example, made of PTFE). The first pressure sensor 11 includes an almost (reversed) L-shaped channel 112 for connecting the pressure transducer 111 and a channel of an upstream side, and an almost L-shaped channel 113 for connecting the pressure transducer 111 and the channel 141 of the tube base 14 under the pressure transducer 111. Fittings 114, 115 of resin (for example, made of PTFE) are formed at ends of the channels 112, 113.

The second pressure sensor 12 has the same structure as the first pressure sensor 11. The second pressure sensor 12 includes a pressure transducer 121 in which a member 1211 exposed to the liquid is positioned, a channel 122 connected to the channel 142 of the tube base 14 through a fitting 124, and a channel 123 connected to a channel of a downstream side through a fitting 125. In the first preferred embodiment, the first pressure sensor 11 and the second pressure sensor 12 have a measuring range from 0 to 0.2 Mpa.

In the differential pressure flowmeter 1, an end in a downstream side of the channel 123 which is an outlet of the second pressure sensor 12 is positioned at the same height with respect to a vertical direction as an end in an upstream side of the channel 112 which is an inlet of the first pressure sensor 11. In injection of the liquid from an upstream side of the differential pressure flowmeter 1 (i.e., an end of the fitting 114 of the channel 112), air within the differential pressure flowmeter 1 tends to come out from a downstream side of the differential pressure flowmeter 1 (i.e., an end of the fitting 125 of the channel 123) to the outside. It is thereby possible to inject the liquid easily into the differential pressure flowmeter 1 to compare with a case where the end of the downstream side of the channel 123 is positioned at a lower position than the end of the upstream side of the channel 112. In the differential pressure flowmeter 1, by lowering heights of the pressure transducers 111, 121, air exhaustion in injecting the liquid can be performed easily. In addition, the end of the downstream side of the channel 123 may be positioned at a higher position than the end of the upstream side of the channel 112 in the differential pressure flowmeter 1.

In the differential pressure flowmeter 1, the liquid flows into the channel 112 of the first pressure sensor 11 from the upstream channel continuously, the liquid passes through the first pressure sensor 11, the tube 13 and the second pressure sensor 12 sequentially, and then flows out of the channel 123 of the second pressure sensor 12 to the downstream channel. While the liquid is passing through the differential pressure flowmeter 1, a flowrate of the liquid is measured continuously. Next discussion will be made on an operation flow for measuring the flowrate of the liquid.

In the differential pressure flowmeter 1, while the liquid is flowing through the differential pressure flowmeter 1, a pressure (hereinafter, referred to as "inlet pressure") of the liquid flowing into the tube 13 is measured by the first pressure sensor 11 and a pressure (hereinafter, referred to as "outlet pressure") of the liquid flowing out of the tube 13 is measured by the second pressure sensor 12. Subsequently, outputs from the first pressure sensor 11 and the second pressure sensor 12 are transmitted to a subtracter 161 of an operation part 16, the output of the second pressure sensor 12 is subtracted from the output of the first pressure sensor 11 in the subtracter 161, and then a pressure difference between both ends of the tube 13 is obtained. The pressure difference is a difference between the inlet pressure and the outlet pressure.

Figure 3:
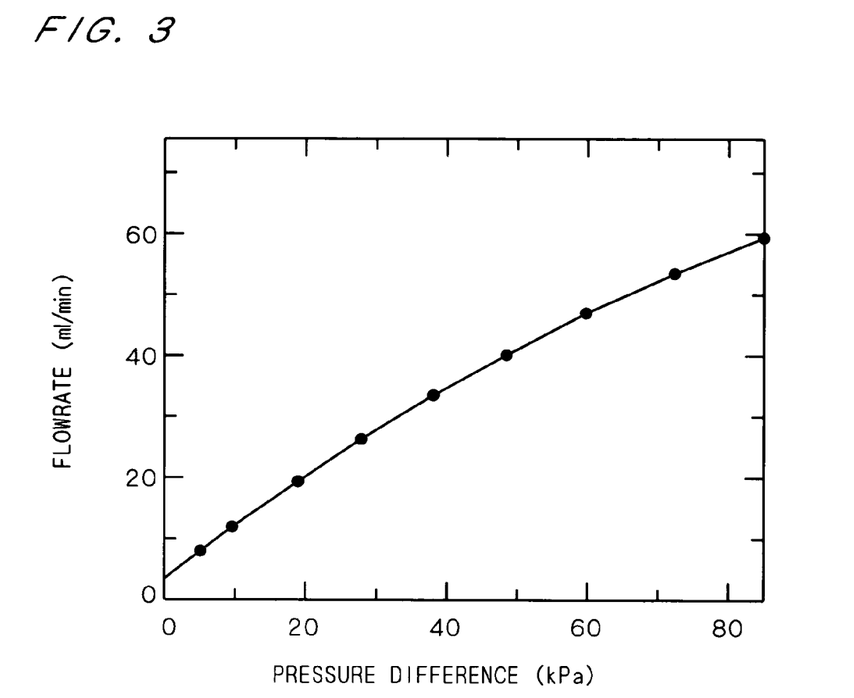
FIG. 3 is a graph illustrating a relation between a pressure difference and a flowrate.

FIG. 3 is a graph illustrating a relation (hereinafter referred to as "flowrate information") between the pressure difference between both ends of the tube 13 and the flowrate of the liquid flowing through the tube 13. As shown in FIG. 3, the pressure difference and the flowrate have an approximately proportionality relation in the differential pressure flowmeter 1. Since the flow within the tube 13 is laminar where the Reynolds number is less than or equal to 2000, the pressure difference and the flowrate should be directly proportioned theoretically. The reason why the pressure difference and the flowrate are not perfectly proportioned is considered as an effect of the flow in the vicinity of both ends of the tube 13, a state of an inside surface of the tube 13, and the like.

Before the differential pressure flowmeter 1 is actually installed on the conduit of a practical apparatus (substrate processing apparatus, for example) to be used, the flowrate information is obtained by the following method in advance. In the upstream side of the channel 112 of the differential pressure flowmeter 1, a syringe pump is attached to the channel 112 and the liquid (preferably, the pure water) is injected at a constant ejection rate. The injected liquid passes through the first pressure sensor 11, the tube 13, and the second pressure sensor 12 and flows out of the channel 123. In the first pressure sensor 11 and the second pressure sensor 12, a pressure in passing of the liquid is measured and a pressure difference is obtained. After the passage of a predetermined time, a weight of the liquid flowing out of the channel 123 is measured and a flowrate corresponding to the pressure difference is obtained. Then, by changing the ejection rate of the syringe pump and repeating measurement of the pressure difference and the flowrate, the flowrate information shown in FIG. 3 is obtained. This obtained flowrate information is stored in a storage part 15 before actual use of the differential pressure flowmeter 1.

In the differential pressure flowmeter 1 shown in FIG. 1, the pressure difference between both ends of the tube 13 obtained by the subtracter 161 is transmitted to a linearizer 162 and the flowrate information stored in the storage part 15 in advance is read out by the linearizer 162. In the linearizer 162, the flowrate of the liquid flowing through the tube 13 is determined automatically on the basis of the pressure difference and the flowrate information. The flowrate information stored in the storage part 15 may be a tabular form or an approximation formula, for example.

As mentioned above, in differential pressure flowmeter 1, the flow of the liquid is kept laminar, and then the pressure difference between both ends of the tube 13 and the flowrate have the approximately proportionality relation. This prevents resolution of the pressure difference and the flowrate from changing considerably and makes the measuring accuracy of the flowrate almost constant regardless of the pressure difference. Since a change of the flowrate relative to that of the pressure difference increases, in comparison with another measurement within turbulent region where the flowrate is approximately proportioned to square root of the pressure difference, the measuring accuracy can be improved and further the range of the flowrate which can be measured is expanded. In the differential pressure flowmeter 1, the Reynolds number of the flow within the tube 13 is kept to be less than or equal to 2000 and a transitional flow where a state of the flow becomes unstable is avoided. After the flow is made laminar completely, the pressure difference is obtained and it is thereby possible to perform measurement of the flowrate stably with high accuracy.

By using a long tube 13 as a pressure loss part and reducing the pressure of the liquid gradually in differential pressure flowmeter 1, even if a flowrate of a liquid which has a small flowrate is measured, a significant pressure difference can be obtained without making the inner diameter of the tube 13 extremely small. Therefore, it becomes possible to make the inner diameter of the tube 13 relatively large and there is no need to make the flow velocity of the liquid flowing through the tube 13 extremely high. This results in preventing foreign substances from blocking the tube 13 and also occurring cavitation in the vicinity of an end of the tube 13 in the downstream side and the like. The differential pressure flowmeter 1 is therefore suitable for measuring the flowrate of the liquid which has the small flowrate.

The tube 13, the tube base 14, the members 1111, 1211 of the first pressure sensor 11 and the second pressure sensor 12, and each channel of those are made of resin which has high durability against various kinds of liquid, and thus flowrates of various kinds of liquid can be measured in the differential pressure flowmeter 1. The outer diameter of the tube 13 is set to be 1.5 or more times larger than the inner diameter, the tube 13 has full mechanical strength, and therefore this prevents the tube 13 from expanding by the pressure of the liquid flowing through the tube 13 and makes it possible to perform higher accurate measurement of the flowrate. Further, by setting the length of the tube 13 to be 130 or more times than the inner diameter of the tube 13, this makes it possible to measure the pressure difference after generating the flow within the tube 13 fully and to perform highly accurate measurement of the flowrate.

In the differential pressure flowmeter 1, since the tube 13 has flexibility, the flexibility of arrangement of the tube 13 is improved, and also, since the tube 13 is formed in a coil compactly, it is also possible to reduce a size of the differential pressure flowmeter 1. The tube 13 has a circular section where laminar flow conditions and the like are relatively established, and thus the inner diameter or the like of the tube 13 can be easily determined in the differential pressure flowmeter 1.

As discussed above, in manufacturing the differential pressure flowmeter 1, the inner diameter of the tube 13 is determined on the basis of the maximum value of the measuring flowrate. The length of the tube 13 is determined on the basis of the maximum value of the pressure differences to be measured by the first pressure sensor 11 and the second pressure sensor 12 in the case of the maximum value of the measuring flowrate in view of the inlet length within the tube 13.

Next discussion will be made on how to determine the length of the tube 13. First, an initial length Ls (m) of the tube 13 is obtained by Eq. 3 which is a variation of the Hagen-Poiseuille equation, where Qmax (m$^3$/s) is the maximum value of the measuring flowrate and ΔPmax (Pa) is the maximum value of the pressure difference.

$$Ls=(\pi \cdot \Delta P max \cdot D^4)/(128\ \mu \cdot Qmax) \qquad \text{Eq. 3}$$

In Eq. 3, D (m) and μ(N·s/m$^2$) are the inner diameter of the tube 13 and the coefficient of viscosity of the liquid flowing through the tube 13, the same as Eq. 1. The Hagen-Poiseuille equation is an equation for obtaining a pressure loss in laminar region of flow within a straight circular tube. An actual pressure loss in the tube 13 becomes greater than a pressure loss calculated from the equation because of the shape of the tube 13, increase of the pressure loss in the inlet length, increase of resistance by the state of the inside surface or the manufacturing accuracy of the tube 13, or the like, and the initial length Ls becomes longer than a length of the tube 13 which is finally determined.

After the initial length of the tube 13 is obtained, the tube 13 of the initial length is attached to the tube base 14, the liquid is injected from the syringe pump attached to the channel 112 at a flowrate of Qmax (i.e., the maximum value of the measuring flowrate), and then the pressure difference between both ends of the tube 13 is measured. In the case where the measured pressure difference is greater than the desired maximum value, the tube 13 is detached from the tube base 14, after cutting and shortening the tube 13 with a tube cutter, the tube 13 is attached to the tube base 14 again. Until the maximum value of the desired pressure difference is obtained, by repeating measurement of the pressure difference and shortening the tube 13, the length of the tube 13 is determined. A cutting length in shortening the length of the tube 13 is predictable easily by some calculations.

In the differential pressure flowmeter 1, since both ends of the tube 13 are attached detachably to the tube base 14 through the tube fittings 131, 132, the length of the tube 13 can be adjusted easily. This makes it possible to manufacture the differential pressure flowmeter 1 easily. In reproducing the differential pressure flowmeter 1, individual variability (for example, a state of an inside surface) of resin tubes used for the tube 13 is easily overcome by adjusting the length of the tube 13, and it becomes possible to manufacture an accurate reproduction of the differential pressure flowmeter 1. Furthermore, if foreign substances block the tube 13, the tube 13 can be exchanged for a new one easily.

Figure 4:
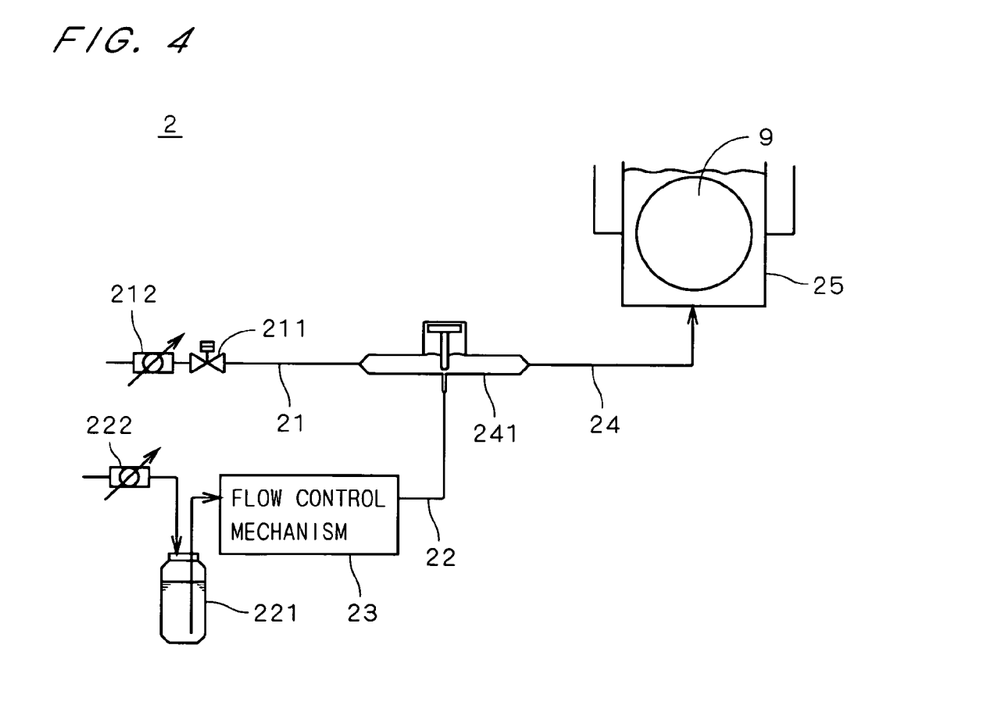
FIG. 4 is a front view illustrating a construction of a substrate processing apparatus in accordance with a second preferred embodiment.

Referring to FIG. 4, a substrate processing apparatus 2 comprising the differential pressure flowmeter 1 in accordance with the second preferred embodiment of the present invention will be described. The substrate processing apparatus 2 is a so-called batch-type apparatus for etching a plurality of semiconductor substrates 9 (hereinafter, referred to as simply "substrates 9") simultaneously.

As shown in FIG. 4, the substrate processing apparatus 2 includes a first conduit 21 through which pure water flows and a second conduit 22 through which hydrofluoric acid flows. The first conduit 21 and the second conduit 22 are connected at a downstream of both conduits. At a connected point of the first conduit 21 and the second conduit 22 a mixing valve 241 is installed, the pure water from the first conduit 21 and the hydrofluoric acid from the second conduit 22 are mixed in the mixing valve 241 and a processing liquid is generated.

In the substrate processing apparatus 2, a third conduit 24 through which the processing liquid which is a mixture of the pure water and the hydrofluoric acid flows is provided in a downstream side of the mixing valve 241. A process bath 25 is located in a downstream side of the third conduit 24 (i.e., a downstream side of the connected point of the first conduit 21 and the second conduit 22). The process bath 25 stores the processing liquid and where a plurality of substrates 9 which are approximately circular in shape are dipped vertically. The substrate processing apparatus 2 further comprises a flow control mechanism 23 installed on the second conduit 22 and controls a flowrate of the hydrofluoric acid.

The first conduit 21 is connected to an external pure water supply apparatus through a valve 211 and a regulator 212 in an upstream side of the first conduit 21. The second conduit 22 is connected to a pressure vessel 221 in an upstream side of the second conduit 22 and the hydrofluoric acid is stored in the pressure vessel 221. The pressure vessel 221 is connected to an external nitrogen gas supply apparatus through a regulator 222. An inside surface of the pressure vessel 221 is covered with PTFE, for example.

Figure 5:
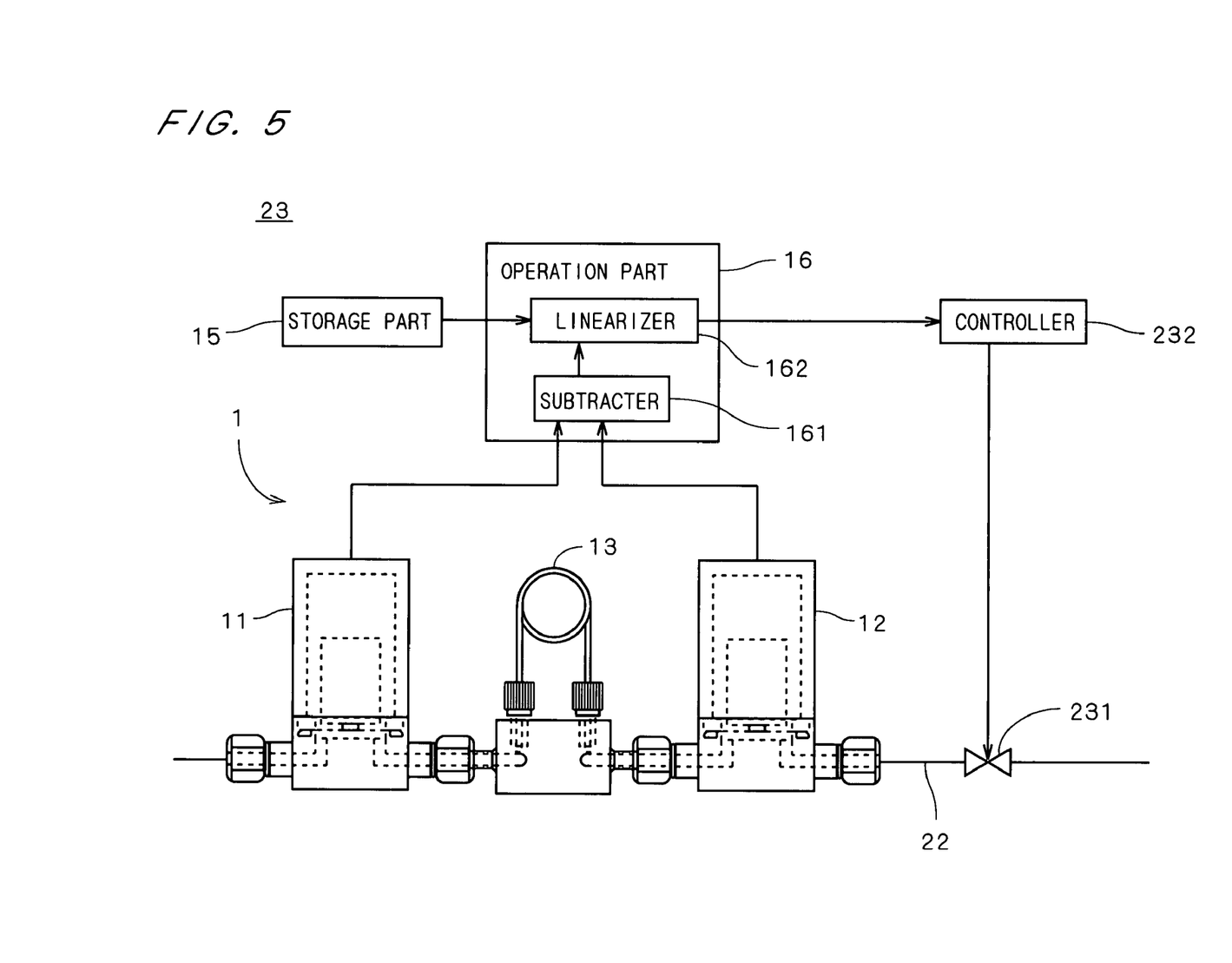
FIG. 5 is an enlarged front view of the vicinity of a flow control mechanism.

FIG. 5 is an enlarged front view of the vicinity of the flow control mechanism 23. As shown in FIG. 5, the flow control mechanism 23 comprises the differential pressure flowmeter 1 described in the first preferred embodiment, the differential pressure flowmeter 1 is installed on the second conduit 22 and measures the flowrate of the hydrofluoric acid flowing through the second conduit 22. The differential pressure flowmeter 1 of FIG. 5 has the same constituent elements as those of FIG. 1 and the constituent elements are represented by the same reference signs in the following description.

The flow control mechanism 23 includes a motor valve 231 for adjusting a flow of the hydrofluoric acid (i.e., the flowrate) and further includes a controller 232 for controlling valve opening of the motor valve 231 on the basis of a predetermined flowrate and the flowrate of the hydrofluoric acid obtained by the operation part 16 of the differential pressure flowmeter 1. The motor valve 231 is installed on the second conduit 22 and in a downstream side of the differential pressure flowmeter 1. The motor valve 231 may be installed in an upstream side of the differential pressure flowmeter 1.

In the substrate processing apparatus 2 shown in FIG. 4, by opening the valve 211, the pure water is supplied from the pure water supply apparatus to the first conduit 21. Simultaneously, nitrogen gas is supplied from the nitrogen gas supply apparatus to the pressure vessel 221 and the hydrofluoric acid in the pressure vessel 221 is supplied to the second conduit 22 at a very small flowrate. A pressure of the nitrogen gas which is supplied to the pressure vessel 221 is set to be normally 200 to 300 kPa. The hydrofluoric acid supplied to the second conduit 22 passes through the flow control mechanism 23, the hydrofluoric acid is mixed with the pure water supplied to the first conduit 21 in the mixing valve 241, and then the mixture (i.e., the processing liquid) flows through the third conduit 24 to be supplied to the process bath 25 from the bottom thereof. The plurality of substrates 9 are held in the process bath 25, they are dipped gradually from the bottoms thereof into the processing liquid which is supplied to the process bath 25 and stored therein, and then etching of the substrates 9 is performed.

In the process of the substrate 9, the flowrate of the hydrofluoric acid is controlled by the flow control mechanism 23 in the substrate processing apparatus 2. Specifically, the flowrate of the hydrofluoric acid flowing through the second conduit 22 is determined by the linearizer 162 on the basis of the pressure difference between both ends of the tube 13 obtained by the first pressure sensor 11, the second pressure sensor 12, and the subtracter 161 shown in FIG. 5 and the flowrate information stored in the storage part 15 in advance. The linearizer 162 converts the flowrate of the hydrofluoric acid into an electrical signal and outputs the electrical signal to the controller 232. In the controller 232, on the basis of an output (i.e., a measuring flowrate) from the linearizer 162 and a predetermined flowrate which is set to be inputted externally or the like, an operation rate of the motor valve 231 is determined and the valve opening of the motor valve 231 is controlled. The control of the motor valve 231 utilizes a control method such as PID control or the like. The predetermined flowrate may be directly inputted from an input part such as a keyboard or the like connected to the controller 232 and the predetermined flowrate may be inputted or changed by remote control.

In the flow control mechanism 23 of the substrate processing apparatus 2, since the valve opening of the motor valve 231 is controlled on the basis of the flowrate of the hydrofluoric acid which is stably measured by the differential pressure flowmeter 1 with high accuracy, a supply rate of the hydrofluoric acid to the downstream (i.e., the mixing valve 241) can be controlled more accurately. As a result, by using the processing liquid wherein the hydrofluoric acid is mixed accurately at the desired concentration, etching of the substrate 9 can be performed in the substrate processing apparatus 2.

In the substrate processing apparatus 2, a dilute hydrofluoric acid solution is generated, and a concentration of the hydrofluoric acid in the solution is controlled high accurately by the differential pressure flowmeter 1 which is suitable for measuring a very small flowrate. By using the dilute hydrofluoric acid solution as the processing liquid and performing etching, an etching rate is controlled high accurately and a more preferable processing result can be obtained. Also, by lowering the etching rate and controlling processing time variation in an upper side and a lower side of the substrate 9, uniformity of etching quality in all areas of the substrate 9 can be improved.

Figure 6:
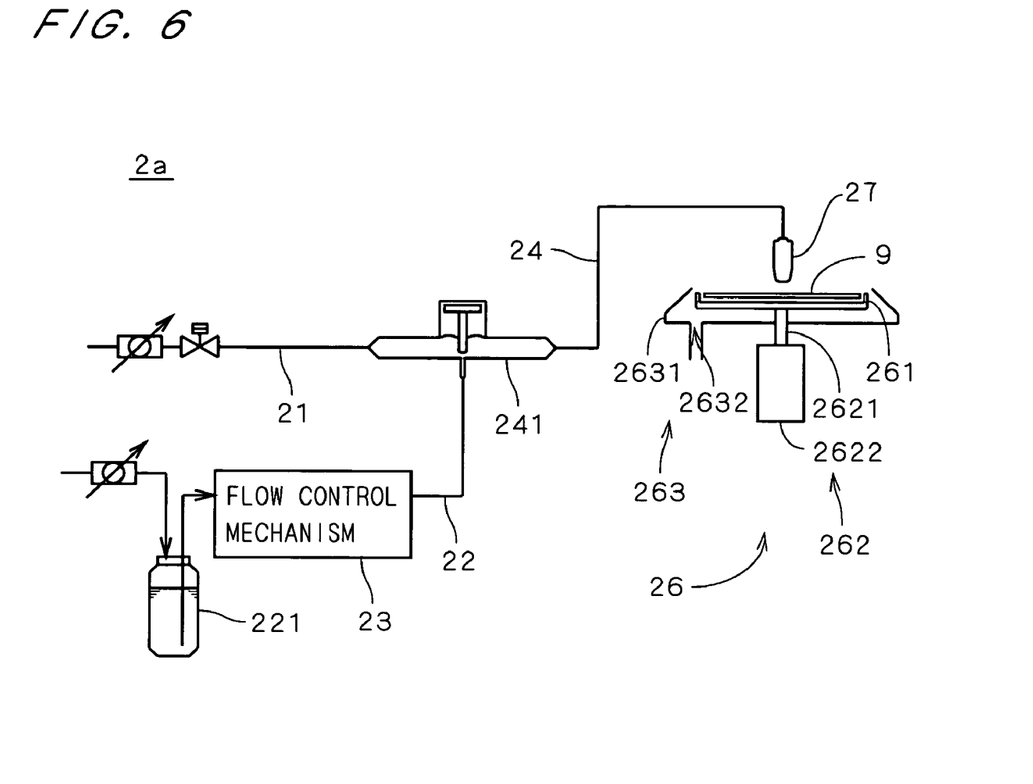
FIG. 6 is a front view illustrating a construction of a substrate processing apparatus in accordance with a third preferred embodiment.

Referring to FIG. 6, another substrate processing apparatus 2a comprising the differential pressure flowmeter 1 in accordance with the third preferred embodiment is described. The substrate processing apparatus 2a is a so-called single wafer-type apparatus for etching one substrate 9 and includes a substrate holding part 26 instead of the process bath 25 of the substrate processing apparatus 2 shown in FIG. 4. A nozzle 27 is located in an upper part of the substrate holding part 26, the nozzle 27 serves as a processing liquid supply part for supplying the processing liquid to the substrate 9. Other constituent elements are the same as those of FIG. 4 and the constituent elements are represented by the same reference signs in the following description. The constituent elements of the flow control mechanism 23 are the same as those of FIG. 5.

As shown in FIG. 6, the substrate processing apparatus 2a, as in the second preferred embodiment, includes the first conduit 21 through which the pure water flows and the second conduit 22 through which the hydrofluoric acid flows and connects with the first conduit 21 in the mixing valve 241. The substrate processing apparatus 2a also includes the flow control mechanism 23 installed on the second conduit 22, the pressure vessel 221 connected to the upstream side of the second conduit 22 and in which the hydrofluoric acid is stored, and the third conduit 24 installed in the downstream side of the mixing valve 241 and through which the processing liquid, which is the mixture of the pure water and the hydrofluoric acid, flows.

The substrate holding part 26 and the nozzle 27 are positioned in the downstream side of the mixing valve 241 which is located at the connected point of the first conduit 21 and the second conduit 22 and the nozzle 27 is connected to the downstream side of the third conduit 24. The substrate holding part 26 has a chuck 261 for holding the approximately circular substrate 9 on the lower surface and the periphery of the substrate 9, a rotating mechanism 262 for rotating the substrate 9, and a process cup 263 for covering the circumference of the chuck 261.

The rotating mechanism 262 has a shaft 2621 coupled to the bottom of the chuck 261 and a motor 2622 for rotating the shaft 2621. By driving the motor 2622, the substrate 9 rotates together with the shaft 2621 and the chuck 261. The process cup 263 has a side wall 2631, placed in the circumference of the chuck 261, for preventing the processing liquid supplied to the substrate 9 from splashing around, and an outlet 2632, provided in the bottom of the process cup 263, for discharging the processing liquid supplied to the substrate 9.

In the substrate processing apparatus 2a, as in the second preferred embodiment, the pure water supplied to the first conduit 21 and the hydrofluoric acid supplied to the second conduit 22 are mixed in the mixing valve 241 and the processing liquid which is the dilute hydrofluoric acid solution is generated. At this time, in the flow control mechanism 23, the flowrate of the hydrofluoric acid flowing at a very small flowrate is stably measured by the differential pressure flowmeter 1 with high accuracy and the motor valve 231 is controlled by the controller 232 on the basis of the measuring flowrate and the predetermined flowrate which is set in advance. As a result, the supply rate of the hydrofluoric acid to the mixing valve 241 is controlled high accurately and the processing liquid wherein the hydrofluoric acid is mixed accurately at the desired concentration is generated.

The processing liquid generated in the mixing valve 241 is supplied to the nozzle 27 through the third conduit 24 and ejected from the nozzle 27 toward the center of the substrate 9 continuously. The substrate 9 is hold by the substrate holding part 26 and rotates, while the processing liquid supplied from the nozzle 27 moves a top of the substrate 9 toward the outside thereof by the centripetal force, the processing liquid spreads in all areas of the top of the substrate 9, and then etching of the substrate 9 is performed. When the processing liquid moves out of the edge of the substrate 9, it is received by the side wall 2631 of the process cup 263 away from the substrate 9 or falls on the bottom of the process cup 263 directly and then the processing liquid is discharged from the outlet 2632.

In the substrate processing apparatus 2a, it is also possible to control the supply rate of the hydrofluoric acid high accurately by the flow control mechanism 23 and perform etching of the substrate 9 with the processing liquid where the hydrofluoric acid is mixed accurately at the desired concentration, similar to the second preferred embodiment. By performing etching with the dilute hydrofluoric acid solution of a concentration controlled with high accuracy, the etching rate is controlled high accurately and a more preferable processing result can be obtained. Also, by lowering the etching rate and controlling processing time variation in the center and the edge of the substrate 9, uniformity of etching quality in a whole upper surface of the substrate 9 can be improved.

Though the preferred embodiments of the present invention have been discussed above, the present invention is not limited to the above-discussed preferred embodiments, but allows various variations.

The tube 13 of the differential pressure flowmeter 1 is not necessarily made of resin and it may be made by other materials. In this case, it is preferable that the tube 13 is made by materials which have high durability against various kinds of liquid.

In the differential pressure flowmeter 1, the tube fittings 131, 132 may be directly attached to the fitting 115 of the first pressure sensor 11 and the fitting 124 of the second pressure sensor 12, respectively. In this case, the tube fittings 131, 132 and the fittings 115, 124 serve as two fittings which attach both ends of the tube 13 detachably to the channel 113 of the first pressure sensor 11 and the channel 122 of the second pressure sensor 12, respectively.

In the substrate processing apparatus in accordance with the second and the third preferred embodiments, liquids other than the pure water and the hydrofluoric acid may be mixed, and other processes (cleaning process, for example) except for etching of the substrate 9 may be performed.

Though in the above preferred embodiments it is described how to measure the flowrate of the liquid by the differential pressure flowmeter 1, a flowrate of a gas may be measured by the differential pressure flowmeter 1 and this differential pressure flowmeter 1 can be utilized as a substrate processing apparatus for processing a substrate with a mixed gas.

While the invention has been shown and described in detail, the foregoing description is in all aspects illustrative and not restrictive. It is therefore understood that numerous modifications and variations can be devised without departing from the scope of the invention.

This application claims priority benefit under 35 U.S.C. Section 119 of Japanese Patent Application No. 2004-345162 filed in the Japan Patent Office on Nov. 30, 2004, the entire disclosure of which is incorporated herein by reference.

What is claimed is:

1. A differential pressure flowmeter for measuring a flowrate of a fluid, comprising:
    a circular tube formed in a coil, a flow of a fluid with a Reynolds number less than or equal to 2000 being formed in the circular tube;
    a first pressure sensor, placed in an upstream side of said circular tube, for measuring a pressure of said fluid flowing into said circular tube; and
    a second pressure sensor, placed in a downstream side of said circular tube, for measuring a pressure of said fluid flowing out of said circular tube.

2. The differential pressure flowmeter according to claim 1, wherein
    said circular tube is made of resin.

3. The differential pressure flowmeter according to claim 2, wherein
    an outer diameter of said circular tube is 1.5 or more times larger than an inner diameter of said circular tube.

4. The differential pressure flowmeter according to claim 1, wherein
    said circular tube has flexibility.

5. The differential pressure flowmeter according to claim 1, wherein
a length of said circular tube is 130 or more times than an inner diameter of said circular tube.

6. The differential pressure flowmeter according to claim 1, further comprising
two fittings for attaching both ends of said circular tube detachably to a channel connected to said first pressure sensor and a channel connected to said second pressure sensor, respectively.

7. The differential pressure flowmeter according to claim 1, wherein
said fluid is liquid, and
an outlet of said second pressure sensor is positioned at the same height with respect to a vertical direction as an inlet of said first pressure sensor or at a higher position than said inlet of said first pressure sensor.

8. The differential pressure flowmeter according to claim 1, further comprising
a storage part for storing flowrate information in advance, said flowrate information indicating a relation between a pressure difference and a flowrate of said fluid flowing through said circular tube, said pressure difference being a difference between a pressure of said fluid flowing into said circular tube and a pressure of said fluid flowing out of said circular tube; and
an operation part for obtaining said pressure difference from outputs of said first pressure sensor and said second pressure sensor and determining said flowrate of said fluid on the basis of said flowrate information and said pressure difference.

9. A flow controller for controlling a flowrate of a fluid, comprising:
a differential pressure flowmeter, installed on a conduit through which a fluid flows, for measuring a flowrate of said fluid;
a valve installed on said conduit, for adjusting a flow of said fluid; and
a controller for controlling valve opening of said valve on the basis of a predetermined flowrate and said flowrate of said fluid obtained by said differential pressure flowmeter, wherein
said differential pressure flowmeter comprises
a circular tube in which said flow of said fluid with a Reynolds number less than or equal to 2000 is formed;
a first pressure sensor, placed in an upstream side of said circular tube, for measuring a pressure of said fluid flowing into said circular tube;
a second pressure sensor, placed in a downstream side of said circular tube, for measuring a pressure of said fluid flowing out of said circular tube;
a storage part for storing flowrate information in advance, said flowrate information indicating a relation between a pressure difference and a flowrate of said fluid flowing through said circular tube, said pressure difference being a difference between a pressure of said fluid flowing into said circular tube and a pressure of said fluid flowing out of said circular tube; and
an operation part for obtaining said pressure difference from outputs of said first pressure sensor and said second pressure sensor and determining said flowrate of said fluid on the basis of said flowrate information and said pressure difference.

10. The flow controller according to claim 9, wherein
a length of said circular tube of said differential pressure flowmeter is 130 or more times than an inner diameter of said circular tube.

11. A substrate processing apparatus for processing a substrate, comprising:
a first conduit through which a first fluid flows;
a second conduit through which a second fluid flows, said second conduit connected to said first conduit;
a flow controller installed on said second conduit, for controlling a flowrate of said second fluid; and
a process bath, located in a downstream side of a connected point of said first conduit and said second conduit, for storing a processing liquid which is a mixture of said first fluid and said second fluid, in which a substrate being dipped, wherein
said flow controller comprises
a differential pressure flowmeter installed on said second conduit, for measuring said flowrate of said second fluid;
a valve installed on said second conduit, for adjusting a flow of said second fluid; and
a controller for controlling valve opening of said valve on the basis of a predetermined flowrate and said flowrate of said second fluid obtained by said differential pressure flowmeter, and
said differential pressure flowmeter comprises
a circular tube in which said flow of said second fluid with a Reynolds number less than or equal to 2000 is formed;
a first pressure sensor, placed in an upstream side of said circular tube, for measuring a pressure of said second fluid flowing in said circular tube;
a second pressure sensor, placed in a downstream side of said circular tube, for measuring a pressure of said second fluid flowing out of said circular tube;
a storage part for storing flowrate information in advance, said flowrate information indicating a relation between a pressure difference and said flowrate of said second fluid flowing through said circular tube, said pressure difference being a difference between a pressure of said second fluid flowing into said circular tube and a pressure of said second fluid flowing out of said circular tube; and
an operation part for obtaining said pressure difference from outputs of said first pressure sensor and said second pressure sensor and determining said flowrate of said second fluid on the basis of said flowrate information and said pressure difference.

12. The substrate processing apparatus according to claim 11, wherein
a length of said circular tube of said differential pressure flowmeter is 130 or more times than an inner diameter of said circular tube.

13. A substrate processing apparatus for processing a substrate, comprising:
a substrate holding part for holding a substrate;
a first conduit through which a first fluid flows;
a second conduit through which a second fluid flows, said second conduit connected to said first conduit;
a flow controller installed on said second conduit, for controlling a flowrate of said second fluid; and
a processing liquid supply part, located in a downstream side of a connected point of said first conduit and said second conduit, for supplying a processing liquid which is a mixture of said first fluid and said second fluid to said substrate, wherein
said flow controller comprises
a differential pressure flowmeter installed on said second conduit, for measuring said flowrate of said second fluid;

a valve installed on said second conduit, for adjusting a flow of said second fluid; and a controller for controlling valve opening of said valve on the basis of a predetermined flowrate and said flowrate of said second fluid obtained by said differential pressure flowmeter, and said differential pressure flowmeter comprises a circular tube in which said flow of said second fluid with a Reynolds number less than or equal to 2000 is formed;

a first pressure sensor, placed in an upstream side of said circular tube, for measuring a pressure of said second fluid flowing into said circular tube;

a second pressure sensor, placed in a downstream side of said circular tube, for measuring a pressure of said second fluid flowing out of said circular tube;

a storage part for storing flowrate information in advance, said flowrate information indicating a relation between a pressure difference and said flowrate of said second fluid flowing through said circular tube, said pressure difference being a difference between a pressure of said second fluid flowing into said circular tube and a pressure of said second fluid flowing out of said circular tube; and an operation part for obtaining said pressure difference from outputs of said first pressure sensor and said second pressure sensor and determining said flowrate of said second fluid on the basis of said flowrate information and said pressure difference.

14. The substrate processing apparatus according to claim 13, wherein a length of said circular tube of said differential pressure flowmeter is 130 or more times than an inner diameter of said circular tube.

15. A differential pressure flowmeter for measuring a flowrate of a fluid, comprising:

a circular tube in which a flow of a fluid with a Reynolds number less than or equal to 2000 is formed;

a first pressure sensor, placed in an upstream side of said circular tube, for measuring a pressure of said fluid flowing into said circular tube;

a second pressure sensor, placed in a downstream side of said circular tube, for measuring a pressure of said fluid flowing out of said circular tube; and two fittings for detachably attaching both ends of said circular tube to a channel connected to said first pressure sensor and a channel connected to said second pressure sensor, respectively.

16. The differential pressure flowmeter according to claim 15, wherein said circular tube is made of resin.

17. The differential pressure flowmeter according to claim 15, wherein an outer diameter of said circular tube is 1.5 or more times larger than an inner diameter of said circular tube.

18. The differential pressure flowmeter according to claim 15, wherein said circular tube has flexibility.

19. The differential pressure flowmeter according to claim 15, wherein a length of said circular tube is 130 or more times than an inner diameter of said circular tube.

20. The differential pressure flowmeter according to claim 15, wherein said fluid is liquid, and an outlet of said second pressure sensor is positioned at the same height with respect to a vertical direction as an inlet of said first pressure sensor or at a higher position than said inlet of said first pressure sensor.

21. The differential pressure flowmeter according to claim 15, further comprising a storage part for storing flowrate information in advance, said flowrate information indicating a relation between a pressure difference and a flowrate of said fluid flowing through said circular tube, said pressure difference being a difference between a pressure of said fluid flowing into said circular tube and a pressure of said fluid flowing out of said circular tube; and an operation part for obtaining said pressure difference from outputs of said first pressure sensor and said second pressure sensor and determining said flowrate of said fluid on the basis of said flowrate information and said pressure difference.

* * * * *